US009336166B1

(12) United States Patent
Faibish et al.

(10) Patent No.: US 9,336,166 B1
(45) Date of Patent: May 10, 2016

(54) BURST BUFFER APPLIANCE WITH OPERATING SYSTEM BYPASS FUNCTIONALITY TO FACILITATE REMOTE DIRECT MEMORY ACCESS

(71) Applicant: EMC Corporation, Hopkinton, MA (US)

(72) Inventors: Sorin Faibish, Newton, MA (US); Dennis Ting, Groton, MA (US); John Forecast, Newton, MA (US); John M. Bent, Los Alamos, NM (US)

(73) Assignee: EMC Corporation, Hopkinton, MA (US)

( * ) Notice: Subject to any disclaimer, the term of this patent is extended or adjusted under 35 U.S.C. 154(b) by 268 days.

(21) Appl. No.: 13/905,310

(22) Filed: May 30, 2013

(51) Int. Cl.
G06F 13/28 (2006.01)
G06F 12/02 (2006.01)

(52) U.S. Cl.
CPC ............ G06F 13/28 (2013.01); G06F 12/0246 (2013.01)

(58) Field of Classification Search
CPC .............................. G06F 13/28; G06F 12/0246
USPC .......................................................... 711/103
See application file for complete search history.

(56) References Cited

U.S. PATENT DOCUMENTS

| 8,131,814 | B1* | 3/2012 | Schlansker et al. | ........... 709/212 |
| 2004/0010545 | A1* | 1/2004 | Pandya | ................... H04L 29/06 709/203 |
| 2006/0067346 | A1* | 3/2006 | Tucker | ............... G06F 12/1081 370/412 |
| 2006/0282627 | A1* | 12/2006 | Aggarwal | ............. G06F 3/0608 711/154 |
| 2008/0140724 | A1* | 6/2008 | Flynn et al. | ................. 707/104.1 |
| 2009/0292861 | A1* | 11/2009 | Kanevsky | ............... G06F 3/061 711/103 |
| 2010/0083247 | A1* | 4/2010 | Kanevsky et al. | ................. 718/1 |
| 2011/0022801 | A1* | 1/2011 | Flynn | ............................ 711/120 |
| 2011/0246597 | A1* | 10/2011 | Swanson et al. | .............. 709/212 |

OTHER PUBLICATIONS

Yufei Ren et al., "Middleware Support for RDMA-based Data Transfer in Cloud Computing," Parallel and Distributed Processing Symposium Workshops & PhD Forum (IPDPSW), 2012 IEEE 26th International, May 21-25, 2012.*
J. Bent et al., "PLFS: A Checkpoint Filesystem for Parallel Applications," ACM/IEEE Conference on High Performance Computing Networking, Storage and Analysis, SC09, Nov. 2009, 12 pages, Article No. 21.

* cited by examiner

*Primary Examiner* — Kevin Verbrugge
*Assistant Examiner* — Ramon A Mercado
(74) *Attorney, Agent, or Firm* — Ryan, Mason & Lewis, LLP

(57) ABSTRACT

A burst buffer appliance is adapted for coupling between a computer system and a file system. The burst buffer appliance comprises a first memory, at least one additional memory, and a controller. The controller is configured to detect a remote direct memory access operation between a given compute node of the computer system and the additional memory, and to execute the detected remote direct memory access operation in a manner that bypasses utilization of an operating system associated with the first memory. The first and additional memories may comprise respective main and flash memories. The controller may comprise a virtual machine arranged between a host channel adaptor of the burst buffer appliance and the additional memory, with the virtual machine configured to identify a remote direct memory access operation directed to an address space of the additional memory and to control the flow of data associated with that operation.

20 Claims, 6 Drawing Sheets

BURST BUFFER APPLIANCE WITH OPERATING SYSTEM BYPASS FUNCTIONALITY TO FACILITATE REMOTE DIRECT MEMORY ACCESS

FIELD

The field relates generally to information processing systems, and more particularly to information processing systems comprising multiple compute nodes.

BACKGROUND

It is common in high-performance computing (HPC) systems and other information processing systems for multiple compute nodes to access a shared file system. For example, HPC systems such as supercomputers typically include large numbers of compute nodes that access a parallel file system, distributed file system or other type of cluster file system. A cluster file system as the term is broadly used herein generally allows multiple client devices to share access to files over a network, and will typically comprise a large number of distinct storage nodes.

Well-known examples of cluster file systems include the Lustre file system and distributed file systems such as Hadoop Distributed File System (HDFS). These and other file systems utilized by HPC systems can readily scale to support tens of thousands of clients, petabytes of storage, and hundreds of gigabytes per second of aggregate input-output (IO) throughput.

HPC systems are often configured to utilize remote direct memory access (RDMA) techniques. Such techniques provide an application memory of a compute node with direct access to a memory of a storage node associated with the shared file system. This avoids the need to copy data between application memory and operating system data buffers in the compute node, thereby providing increased throughput and reduced latency. Nonetheless, as HPC systems continue to scale ever larger in terms of processing resources, conventional RDMA techniques are unable to provide the desired level of IO throughput performance. A need therefore exists for improved techniques for implementing RDMA in HPC systems and other types of information processing systems.

SUMMARY

Illustrative embodiments of the present invention provide improved RDMA processing in information processing systems, using a burst buffer appliance arranged between a computer system and a file system. The computer system may comprise a supercomputer or other type of HPC system having a large number of compute nodes, or more generally any arrangement of multiple compute nodes that share at least a portion of the file system. The file system may comprise a parallel file system, distributed file system or other type of cluster file system comprising multiple storage nodes, although a non-cluster file system possibly comprising only a single storage node may also be used. It should therefore be appreciated that embodiments of the invention can be implemented using a wide variety of different computer systems and associated file systems.

In one embodiment, a burst buffer appliance is adapted for coupling between a computer system and a file system. The burst buffer appliance comprises a first memory, at least one additional memory, and a controller. The controller is configured to detect an RDMA operation between a given compute node of the computer system and the additional memory, and to execute the detected RDMA operation in a manner that bypasses utilization of an operating system associated with the first memory. Bypassing utilization of the operating system may comprise moving data from a host channel adaptor of the burst buffer appliance to the additional memory without utilizing computational resources of a central processing unit on which the primary operating system executes.

The first memory may comprise a main memory of the burst buffer appliance, and the additional memory may comprise a flash device of the burst buffer appliance, such as a flash PCIe card installed in the burst buffer appliance. Other types of memories may be used in other embodiments.

Also by way of example, the controller may comprise a virtual machine arranged between a host channel adaptor of the burst buffer appliance and the additional memory, with the virtual machine being configured to identify an RDMA operation directed to an address space of the additional memory and to control the flow of data associated with that operation between the host channel adaptor and the additional memory.

The burst buffer appliance may be utilized, for example, to implement a virtual layer of a parallel log-structured file system, and may incorporate one or more analytics engines or other processing components. Numerous other burst buffer appliance configurations can be used in other embodiments.

One or more of the illustrative embodiments described herein exhibit enhanced performance relative to conventional arrangements. For example, these embodiments provide increased processing efficiency for RDMA operations thereby allowing IO throughput performance to more easily scale with the increasing size of an HPC system or other computer system in an information processing system in which compute nodes of the computer system share access to at least a portion of at least one file system. Such embodiments provide improved data flow control in the burst buffer appliance at least in part by ensuring that RDMA access to a flash memory or other additional memory of the burst buffer appliance is not unduly delayed by operations performed by the burst buffer appliance operating system.

DETAILED DESCRIPTION

Illustrative embodiments of the present invention will be described herein with reference to exemplary information processing systems and associated computers, servers, storage devices and other processing devices. It is to be appreciated, however, that embodiments of the invention are not restricted to use with the particular illustrative system and device configurations shown. Accordingly, the term "information processing system" as used herein is intended to be broadly construed, so as to encompass, for example, processing systems comprising private and public cloud computing or storage systems, as well as other types of processing systems comprising physical or virtual processing resources in any combination.

Figure 1:
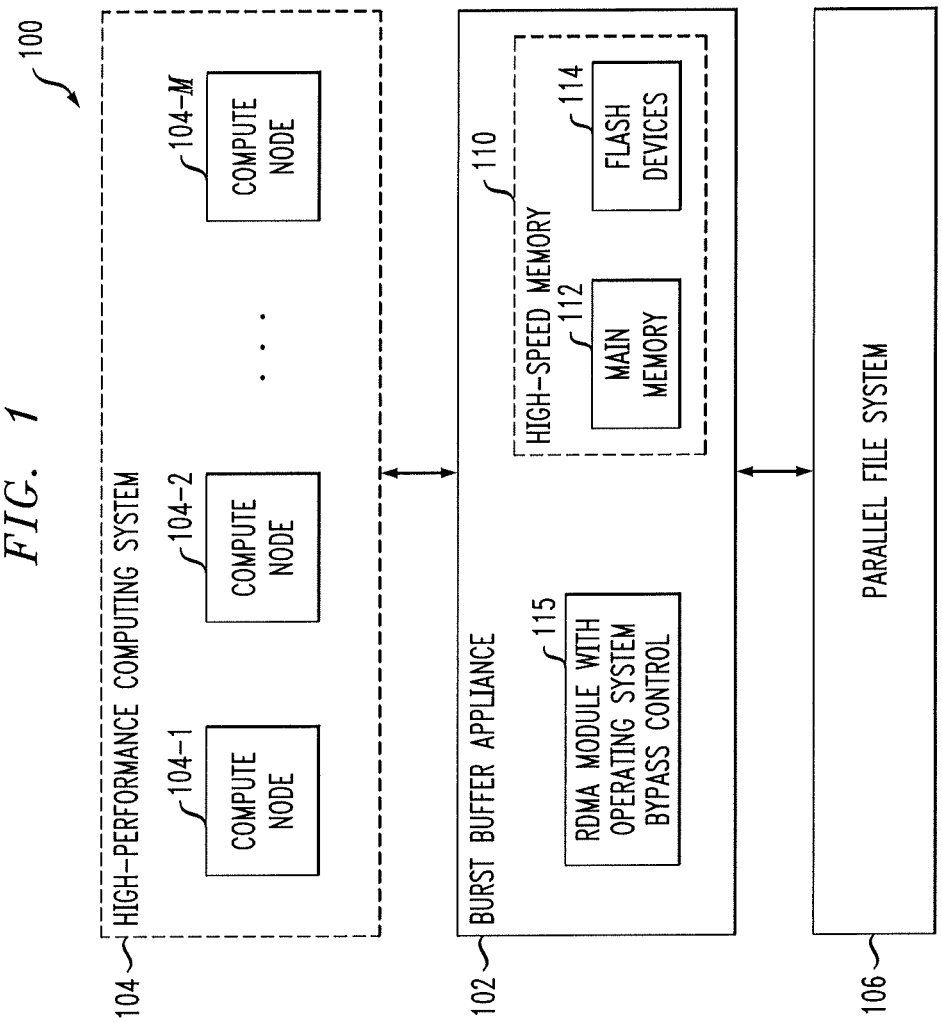
FIG. 1 is a block diagram of an information processing system comprising a burst buffer appliance configured to facilitate RDMA operations in an illustrative embodiment of the invention.

FIG. 1 shows an information processing system 100 configured in accordance with an illustrative embodiment of the present invention. The information processing system 100 comprises a burst buffer appliance 102 and a plurality of compute nodes 104-1, 104-2, ... 104-M. The compute nodes 104 are also collectively referred to as an HPC system, which may comprise, for example, a supercomputer. Such an HPC system is an example of what is more generally referred to herein as a "computer system." The burst buffer appliance 102 is coupled between the HPC system 104 and a parallel file system 106, which is assumed to comprise multiple distinct file systems arranged in parallel with one another. The parallel file system 106 is an example of what is more generally referred to herein as a "cluster file system." Numerous other types of computer systems and file systems may be used in other embodiments of the invention.

Figure 3:
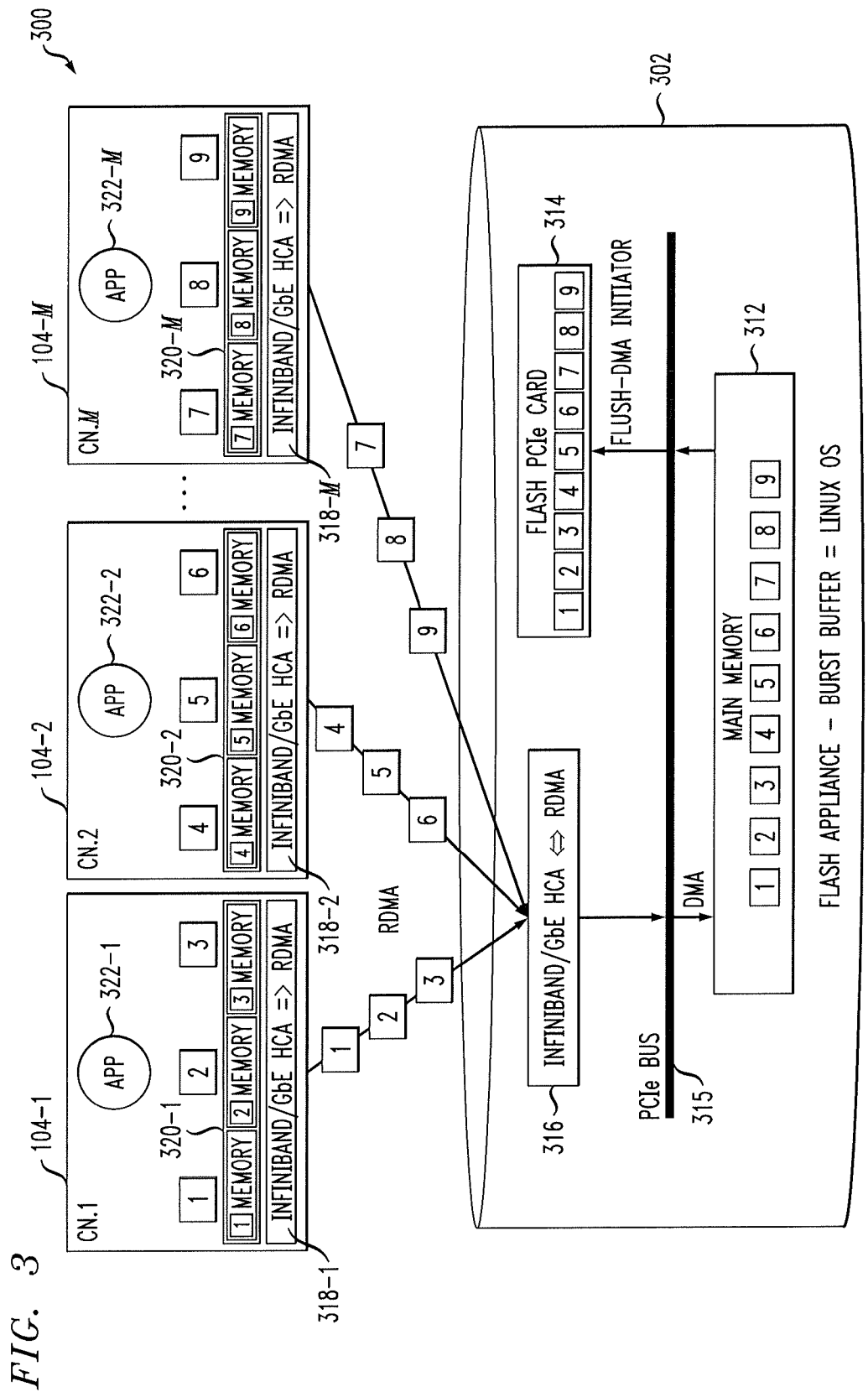
FIGS. 3, 4 and 5 illustrate different embodiments of an information processing system comprising a burst buffer appliance configured to facilitate RDMA operations.
Figure 4:
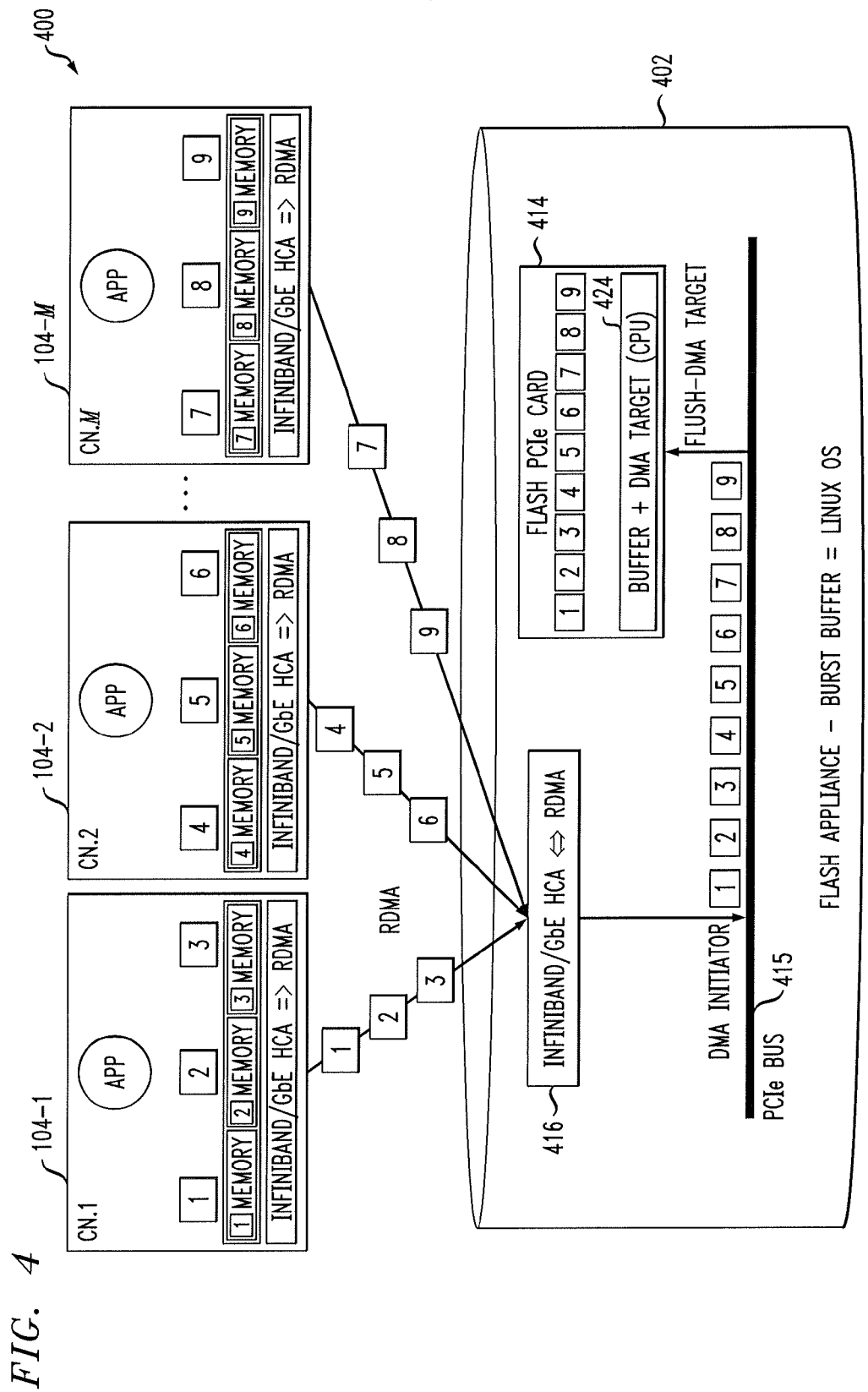
Figure 5:
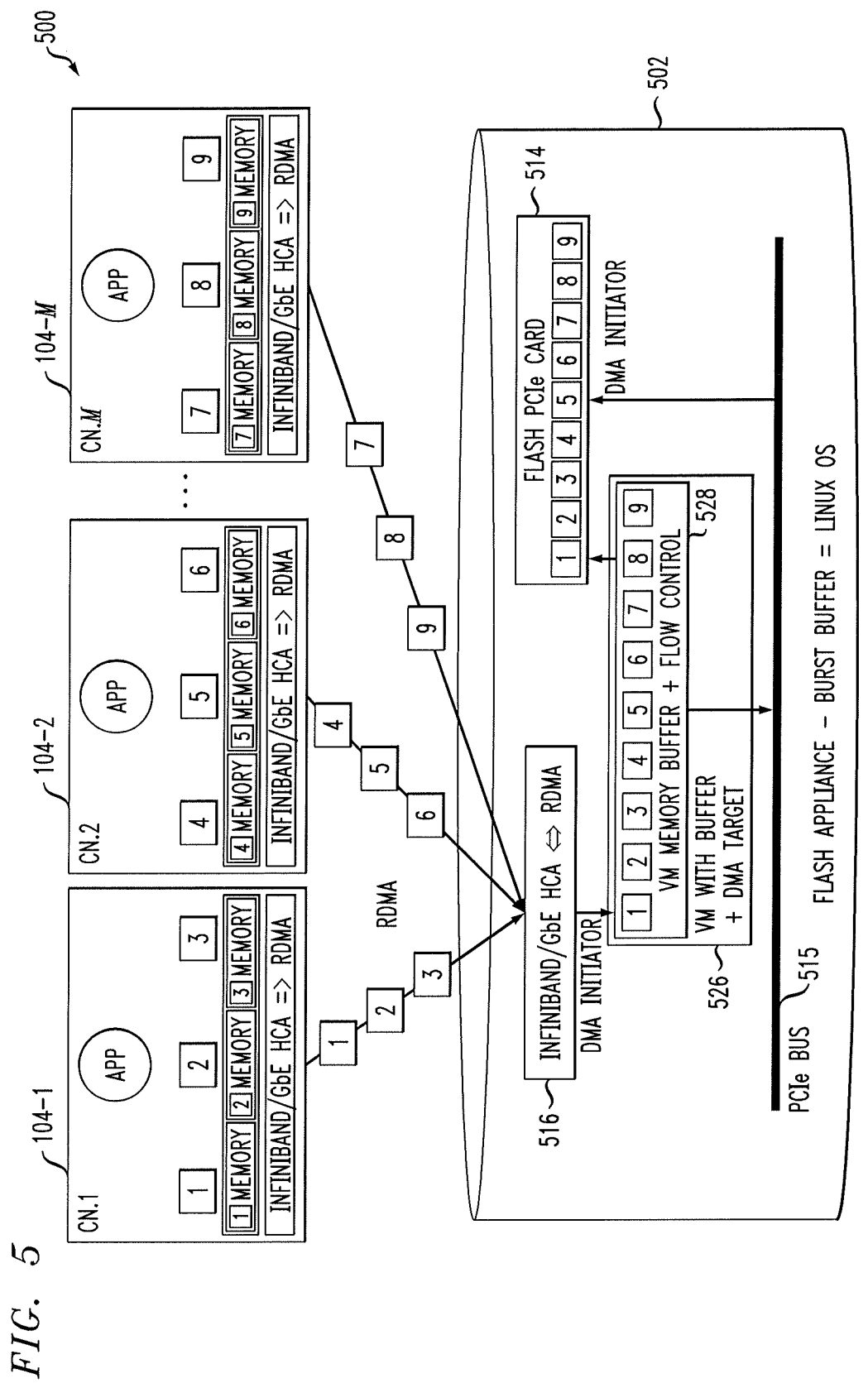

The burst buffer appliance 102 in the present embodiment comprises a high-speed memory 110 that has a substantially lower access time than the file system 106. The high-speed memory 110 more specifically comprises a main memory 112 and a plurality of additional memory devices 114. One or more of the additional memory devices 114 may comprise respective flash Peripheral Component Interconnect express (PCIe) cards, as shown in FIGS. 3, 4 and 5.

It is assumed in the present embodiment that flash memory is used to implement substantially all of the additional memory devices 114. These devices are therefore also designated in the figure as respective flash devices. However, other types of low-latency memory could be used instead of or in combination with flash memory in other embodiments. Typically, such low-latency memories comprise electronic memories, which may be implemented using non-volatile memories, volatile memories or combinations of non-volatile and volatile memories.

The burst buffer appliance further comprises an RDMA module 115 with operating system bypass control. The module 115 is configured to detect an RDMA operation between a given compute node of the HPC system 104 and one or more of the additional memory devices 114, and to execute the detected RDMA operation in a manner that bypasses utilization of an operating system associated with the main memory 112. By way of example, the operating system may comprise a primary operating system of the burst buffer appliance 102, and bypassing utilization of that operating system may comprise moving data from one or more of the compute nodes into one or more of the additional memory devices 114 without utilizing computational resources of a central processing unit (CPU) or other processor on which the primary operating system executes. This provides improved data flow control in the burst buffer appliance 102 by ensuring that RDMA access to a flash memory or other additional memory device 114 of the burst buffer appliance is not unduly delayed by operations performed by the burst buffer appliance operating system.

Additional details regarding examples of operating system bypass control in the burst buffer appliance 102 will be provided below in conjunction with FIGS. 3 to 5.

The RDMA module 115 may be viewed as one example of at least a portion of what is more generally referred to herein as a "controller" of the burst buffer appliance 102. Numerous other types of hardware, software and firmware may be used to implement a controller in other embodiments.

Accordingly, the RDMA module 115 is exemplary only, and the RDMA functionality of the burst buffer appliance 102 may be implemented using other types and arrangements of processing modules.

Also, the burst buffer appliance 102 may comprise other types of components not explicitly shown, such as one or more analytics engines.

The burst buffer appliance 102 in the present embodiment may implement, for example, a virtual layer of a parallel log-structured file system (PLFS), although as indicated previously other types of parallel file systems or more generally cluster file systems may be used in other embodiments.

Additional details regarding PLFS can be found in J. Bent et al., "PLFS: A Checkpoint Filesystem for Parallel Applications," ACM/IEEE Conference on High Performance Computing Networking, Storage and Analysis, SC09, Portland, Oreg., Nov. 14-20, 2009, pp. 1-12, which is incorporated by reference herein. It is to be appreciated, however, that PLFS is not a requirement of any particular embodiment.

Although only a single burst buffer appliance 102 is associated with all of the compute nodes 104 in this embodiment, in other embodiments each compute node or each of other subsets of the compute nodes 104 may have a separate instance of the burst buffer appliance 102 associated therewith. Thus, in some embodiments, a given burst buffer appliance may be coupled between a single compute node and the parallel file system 106. The term "computer system" as broadly used herein should therefore also be understood to encompass an arrangement involving only a single compute node.

The burst buffer appliance 102 may receive data from a variety of sources other than the compute nodes 104, although such other sources are not explicitly shown in the figure. For example, the burst buffer appliance may receive data files comprising sensor data received from sensor networks. It is to be appreciated that a wide variety of additional or alternative data sources may provide data to the burst buffer appliance 102 for storage in the parallel file system 106 in other embodiments.

As mentioned above, the burst buffer appliance 102 comprises a flash memory or other high-speed memory that stores data that is to be delivered to the parallel file system 106 as well as data that has been retrieved from the parallel file system 106. The high-speed memory has a substantially lower access time for write and read operations directed thereto than write and read operations directed to the parallel file system 106. Thus, the burst buffer appliance 102 is configured to accelerate IO operations between the compute nodes 104 and the parallel file system 106 by storing associated data in its high-speed memory 110.

For example, the burst buffer appliance 102 in the present embodiment may be configured to enhance the IO throughput performance of the information processing system 100 by supporting fast checkpointing of one or more compute nodes 104. More particularly, one or more of the compute nodes 104 can write data files comprising checkpoint data to the burst buffer memory 110 at very high speeds, and that checkpoint data is later written at a much slower rate from the memory 110 to the parallel file system 106. This ensures that other operations of the one or more compute nodes 104 are not unduly delayed by the writing of checkpoint data while also allowing the system 100 to continue to utilize the parallel file system 106.

It is also possible that the burst buffer appliance 102 may include multiple virtual machines that facilitate prioritization of checkpoints as well as coordination of priorities for other types of IO operations that involve utilization of the high-speed memory of the burst buffer appliance. For example, different virtual machines of the burst buffer appliance may be used to process different types of data files, such as data files comprising checkpoint data and data files comprising sensor data. Such an arrangement permits different IO throughput performance levels to be provided for the different types of data files. The particular number of virtual machines implemented in the burst buffer appliance 102 may be varied, as well as the types of IO operations that are subject to virtual machine control.

Accordingly, the term "burst buffer appliance" as used herein is intended to be broadly construed, so as to encompass any network appliance or other arrangement of hardware and associated software or firmware that collectively provides a high-speed memory, supplemented in some embodiments by an analytics engine and possibly one or more virtual machines that control access to the high-speed memory for distinct types of IO operations. Thus, such an appliance includes a high-speed memory that may be viewed as serving as a buffer between a computer system comprising compute nodes 104 and a file system such as parallel file system 106, for storing bursts of data associated with different types of IO operations.

The burst buffer appliance 102, compute nodes 104 and parallel file system 106 may communicate with one another over one or more networks such as, for example, a global computer network such as the Internet, a wide area network (WAN), a local area network (LAN), a satellite network, a telephone or cable network, a cellular network, a wireless network such as WiFi or WiMAX, or various portions or combinations of these and other types of communication networks.

At least portions of the burst buffer appliance 102, compute nodes 104 and parallel file system 106 may be implemented using one or more processing platforms, examples of which will be described in greater detail below in conjunction with FIGS. 6 and 7. A given such processing platform comprises at least one processing device comprising a processor coupled to a memory, and the processing device may be implemented at least in part utilizing one or more virtual machines.

Although shown in FIG. 1 as being separate from the compute nodes 104 and parallel file system 106, the burst buffer appliance 102 in other embodiments may be implemented at least in part within one or more of these system elements. It is also to be appreciated that a given embodiment of the information processing system 100 may include multiple instances of one or more of the burst buffer appliance 102, the set of M compute nodes 104 and the parallel file system 106, although only a single instance of each of these elements is shown in the system diagram for clarity and simplicity of illustration.

It should be understood that the particular sets of modules and other components implemented in the system 100 as illustrated in FIG. 1 are presented by way of example only. In other embodiments, only subsets of these components, or additional or alternative sets of components, may be used, and such components may exhibit alternative functionality and configurations.

The operation of the information processing system 100 will now be described in greater detail with reference to the flow diagram of FIG. 2. The process as shown includes steps 200 through 204.

In step 200, a given burst buffer appliance 102 coupled between HPC system 104 and parallel file system 106 is configured to include a high-speed memory having a substantially lower access time than the parallel file system. In the present embodiment, the high-speed memory is assumed to comprise main memory 112 and flash devices 114, with the flash devices implemented using flash memory, although as indicated above other types of low-latency memory could be used.

The main memory 112 and flash devices 114 are assumed to be implemented using different types of memory in the present embodiment, but could be implemented at least in part using the same types of memory in other embodiments.

In step 202, the burst buffer appliance detects an RDMA operation between a given compute node 104 and one of the flash devices 114.

In step 204, the detected RDMA operation is executed in a manner that bypasses utilization of an operating system associated with the main memory 112.

As mentioned previously, bypassing utilization of the operating system associated with the main memory 112 may comprise moving data from one or more of the compute nodes 104 into one or more of the flash devices 114 without utilizing computational resources of a CPU or other processor that executes the primary operating system of the burst buffer appliance 102. In such an arrangement, data files being transferred via RDMA from a compute node to one or more of the flash devices 114 do not pass through the main memory 112 of the burst buffer appliance 102. This ensures that RDMA access to one or more of the flash devices 114 of the burst buffer appliance 102 is not unduly delayed by operations performed by the primary operating system of the burst buffer appliance. Other types of operating system bypass control can be implemented in other embodiments.

Figure 2:
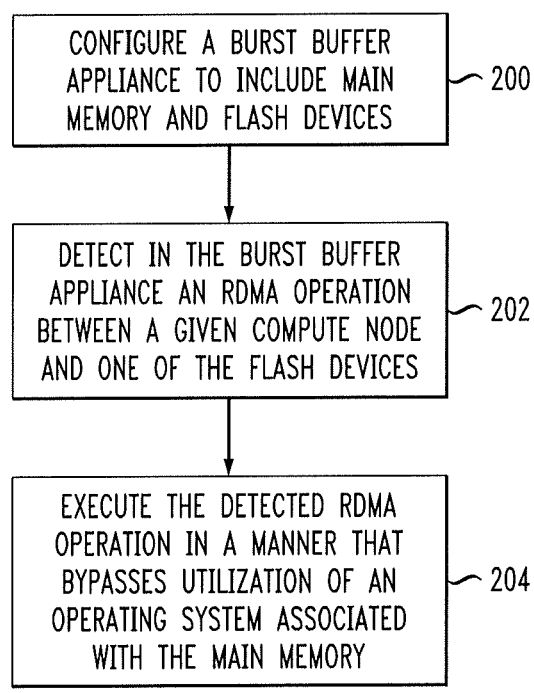
FIG. 2 is a flow diagram illustrating functionality of the burst buffer appliance of FIG. 1.

The particular processing operations and other system functionality described in conjunction with the flow diagram of FIG. 2 are presented by way of illustrative example only, and should not be construed as limiting the scope of the invention in any way. Alternative embodiments can use other types of processing operations to provide efficient RDMA execution in the burst buffer appliance of system 100. For example, the ordering of the process steps may be varied in other embodiments, or certain steps may be performed concurrently with one another rather than serially. Also, one or more of the process steps may be repeated periodically for different processing applications, or performed in parallel for multiple instances of the burst buffer appliance supporting multiple processing applications.

It is to be appreciated that functionality such as that described in conjunction with the flow diagram of FIG. 2 can be implemented at least in part in the form of one or more software programs stored in memory and executed by a processor of a processing device such as a computer or server. As will be described below, a memory or other storage device having such program code embodied therein is an example of what is more generally referred to herein as a "computer program product."

Exemplary operating system bypass control implemented in one or more embodiments of the invention will now be described with reference to FIGS. 3 to 5. FIG. 3 illustrates an arrangement without operating system bypass control, in which data files associated with the RDMA operation pass through the main memory of the burst buffer appliance. FIGS. 4 and 5 illustrate two different arrangements with operating system bypass control, each providing improved performance relative to the arrangement of FIG. 3.

Referring now to FIG. 3, an information processing system 300 comprises compute nodes 104-1 through 104-M as previously described, also denoted as CN.1, CN.2, . . . CN.M, and a burst buffer appliance 302. The burst buffer appliance 302 is assumed to be coupled between the compute nodes 104 and a file system that is not explicitly shown in this figure. The burst buffer appliance 302 includes a main memory 312 and a flash device 314. The flash device 314 is illustratively implemented as a flash PCIe card installed in the burst buffer appliance 302. The main memory 312 and flash device 314 are coupled to a PCIe bus 315. Also coupled to the PCIe bus 315 is a host channel adaptor (HCA) 316. The HCA 316 in this embodiment is illustratively implemented as an InfiniBand/GbE HCA configured to support RDMA operations, where GbE denotes gigabit Ethernet and the symbol "/" denotes "and/or." It should be appreciated, however, that other types and configurations of HCAs may be used.

The burst buffer appliance 302 is assumed to have a Linux operating system as its primary operating system. In addition, read and write operations associated with the main memory 312 are assumed to require utilization of the Linux operating system of the burst buffer appliance. The use of a Linux operating system is by way of example only, and other embodiments can use other operating systems, or different operating systems for different portions of the burst buffer appliance.

The compute nodes 104-1, 104-2, . . . 104-M comprise respective InfiniBand/GbE HCAs 318-1, 318-2, . . . 318-M configured to support RDMA operations, and respective internal memories generally denoted as memories 320-1, 320-2, . . . 320-M. Each of the internal memories 320 is illustratively shown as comprising several distinct portions. The compute nodes 104-1, 104-2, . . . 104-M further comprise respective applications 322-1, 322-2, . . . 322-M each of which provides one or more data files that are to be transferred via the burst buffer appliance 302 to the underlying file system that is not explicitly shown. More particularly, application 322-1 provides data files denoted 1 through 3, application 322-2 provides data files denoted 4 through 6, and application 322-M provides data files denoted 7 through 9.

It is assumed that the data files 1 through 9 are to be transferred from the corresponding compute nodes 104 to the flash device 314 via their respective HCAs 318 and the HCA 316 of the burst buffer appliance 302. In the FIG. 3 arrangement, this requires the data files to pass through the main memory 312 before being delivered to the flash device 314, as shown in the figure, and therefore requires utilization of the Linux operating system of the burst buffer appliance 302. The data transfer in this arrangement more particularly requires a DMA transfer into the main memory 312 over the PCIe bus 315, followed by another DMA transfer from the main memory 312 into the flash device 314 with the flash device in the latter DMA transfer serving as the DMA initiator. It is assumed in the context of the FIG. 3 arrangement that the flash device 314 is able to operate only as a DMA initiator, such that the flash device itself determines when to perform DMA operations to or from that device.

An arrangement of this type results in significant performance degradation compared with the performance that would be achievable using direct RDMA transfers between the compute nodes and the flash device 314. In transfers of the latter type, it is desirable for the transfers to occur substantially at memory speed, so as to preserve low latency within the information processing system 300. However, the arrangement illustrated in FIG. 3 is unable to maintain the desired low latency, and instead results in a transfer that is about 5 to 10 times slower than a direct RDMA transfer from compute node memory to burst buffer appliance memory.

As indicated previously, the embodiments illustrated in FIGS. 4 and 5 provide improved RDMA performance relative to the FIG. 3 arrangement.

FIG. 4 shows an information processing system 400 with compute nodes 104-1 through 104-M as previously described, and a burst buffer appliance 402. The burst buffer appliance 402 is assumed to be coupled between the compute nodes 104 and a file system that is not explicitly shown in this figure. The burst buffer appliance 402 includes a flash device 414 coupled via a PCIe bus 415 to an HCA 416. The flash device 414 is illustratively implemented as a flash PCIe card installed in the burst buffer appliance 402. The HCA 416 is illustratively implemented as an InfiniBand/GbE HCA. The burst buffer appliance 402 is also assumed to comprise a main memory of the type previously described but that main memory is not explicitly shown in this figure.

The flash device 414 is configured in the present embodiment to operate as a DMA target rather than solely as a DMA initiator as in the FIG. 3 embodiment. For example, the flash device 414 may be configured to operate in at least a first mode of operation in which the flash device operates as a DMA initiator and in a second mode of operation in which the flash device operates as a DMA target.

When operating as a DMA initiator, the flash device itself determines when to perform DMA operations to or from that device, as in the arrangement previously described in conjunction with FIG. 3. This can lead to performance degradations in the context of RDMA transfers between the flash device and compute nodes, as previously described.

In the embodiment illustrated in FIG. 4, the flash device 414 can be the target of DMA operations initiated by other components of the burst buffer appliance, in this case the HCA 416. Also, the flash device 414 comprises hardware acceleration circuitry 424 implemented within that device. The hardware acceleration circuitry 424 as illustrated comprises a buffer and associated DMA target circuitry which may comprise at least a portion of a CPU or other processing circuitry implemented within the flash device 414. The flash device 414 is therefore modified in this embodiment to support operation as a DMA target in addition to or in place of its previously-described operation as a DMA initiator.

The flash device 414 comprising hardware acceleration circuitry 424 allows the data files 1 through 9 transferred by RDMA from the compute nodes 104 to be accepted in the flash device 414 substantially at memory speed, while also providing a flow control mechanism relative to the HCA 416. The transfer is performed directly into the DMA memory space of the flash device without the involvement of any main memory controlled by the Linux operating system of the burst buffer appliance. Accordingly, this is one example of an arrangement that bypasses the utilization of the operating system associated with the main memory of the burst buffer appliance.

Elements such as HCA 416 and hardware acceleration circuitry 424 are considered to be encompassed by the term "controller" as broadly used herein. Such elements may also be viewed as comprising portions of the RDMA module 115 with operating system bypass control in the FIG. 1 embodiment.

FIG. 5 shows an information processing system 500 with compute nodes 104-1 through 104-M as previously described, and a burst buffer appliance 502. The burst buffer appliance 502 is assumed to be coupled between the compute nodes 104 and a file system that is not explicitly shown in this figure. The burst buffer appliance 502 includes a flash device 514 coupled via a PCIe bus 515 to an HCA 516. The flash device 514 is illustratively implemented as a flash PCIe card installed in the burst buffer appliance 502. The HCA 516 is illustratively implemented as an InfiniBand/GbE HCA. The burst buffer appliance 502 is also assumed to comprise a main memory of the type previously described but that main memory is not explicitly shown in this figure.

Like the flash device 414, the flash device 514 is configured in the present embodiment to operate as a DMA target rather than solely as a DMA initiator. For example, the flash device 514 may be configured to operate in at least a first mode of operation in which the flash device operates as a DMA initiator and in a second mode of operation in which the flash device operates as a DMA target. As mentioned above, when operating as a DMA initiator, the flash device itself determines when to perform DMA operations to or from that device, which can lead to performance degradations in the context of RDMA transfers between the flash device and compute nodes.

In the embodiment illustrated in FIG. 5, the flash device 514 can be the target of DMA operations initiated by other components of the burst buffer appliance, in this case the HCA 516. The flash device 514 does not include hardware acceleration circuitry as in the FIG. 4 embodiment. Instead, functionality similar to that associated with the hardware acceleration circuitry is implemented in a virtual machine 526 that is arranged between the HCA 516 and the flash device 514 as illustrated. The virtual machine 526 is more particularly configured to identify an RDMA operation directed to an address space of the flash device 514 and to control flow of data associated with that operation between the HCA 516 and the flash device 514. The virtual machine 526 comprises virtual circuitry 528 including a buffer configured to store data passing between the HCA 516 and the flash device 514, and a flow control mechanism associated with the buffer.

The virtual machine 526 serves as an intermediary or bridge between the HCA 516 and the flash device 514. The virtual machine 526 accepts memory addresses in the PCIe range and when such addresses intersect with known DMA addresses of the flash device 514 it directs the corresponding data to those memory locations. The virtual machine buffers the incoming data before writing to the flash device so as to achieve a performance level that is comparable to that of a memory-to-memory RDMA transfer.

The burst buffer appliance 502 therefore allows the data files 1 through 9 transferred by RDMA from the compute nodes 104 to be accepted in the flash device 514 substantially at memory speed, while also providing a flow control mechanism relative to the HCA 516. As in the FIG. 4 embodiment, the transfer is performed directly into the DMA memory space of the flash device without the involvement of any main memory controlled by the Linux operating system of the burst buffer appliance. Accordingly, this is another example of an arrangement that bypasses the utilization of the operating system associated with the main memory of the burst buffer appliance.

Elements such as virtual machine 526 and its associated buffer and flow control mechanisms are considered to be encompassed by the term "controller" as broadly used herein. Such elements may also be viewed as comprising portions of the RDMA module 115 with operating system bypass control in the FIG. 1 embodiment.

The buffers used in the hardware acceleration circuitry 424 of the flash device 414 in the FIG. 4 embodiment and in the virtual machine 526 of the FIG. 5 embodiment may have a storage capacity on the order of about 8 to 16 Mbytes, although other buffer sizes can be used in other embodiments. Such a buffer can facilitate the acceptance of RDMA data substantially at memory speed, thereby avoiding the performance degradation associated with the arrangement described in conjunction with FIG. 3.

The systems of FIGS. 1, 4 and 5 provide increased processing efficiency for RDMA operations thereby allowing IO throughput performance to more easily scale with the increasing size of an HPC system or other computer system in an information processing system in which compute nodes of the computer system share access to at least a portion of at least one file system. For example, these embodiments provide improved data flow control in the burst buffer appliance by ensuring that RDMA access to a flash memory or other additional memory of the burst buffer appliance is not unduly delayed by operations performed by the burst buffer appliance operating system.

It is to be appreciated that functionality such as that described in conjunction with FIGS. 1 through 5 can be implemented at least in part in the form of one or more software programs stored in memory and executed by a processor of a processing device such as a computer or server. As will be described below, a memory or other storage device having such program code embodied therein is an example of what is more generally referred to herein as a "computer program product."

It was noted above that portions of the information processing system 100 may be implemented using one or more processing platforms. Illustrative embodiments of such platforms will now be described in greater detail. Although described in the context of system 100, these platforms may also be used to implement at least portions of the systems 300, 400 and 500 of FIGS. 3 through 5.

Figure 6:
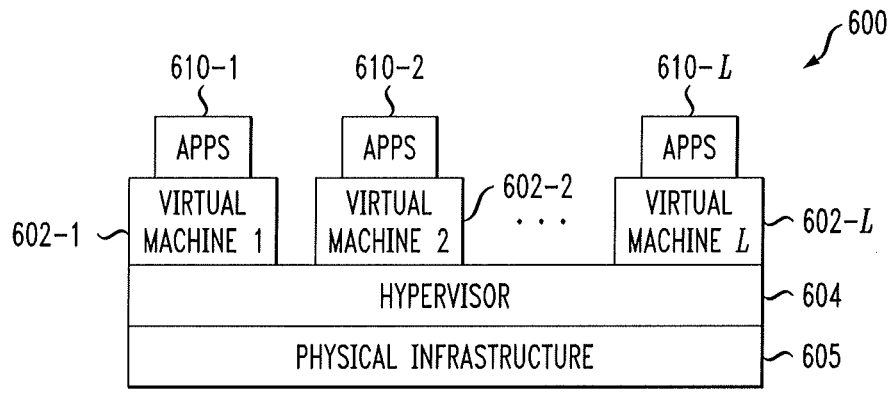
FIGS. 6 and 7 show examples of processing platforms that may be utilized to implement at least a portion of the information processing systems of FIGS. 1 and 3-5.
Figure 7:
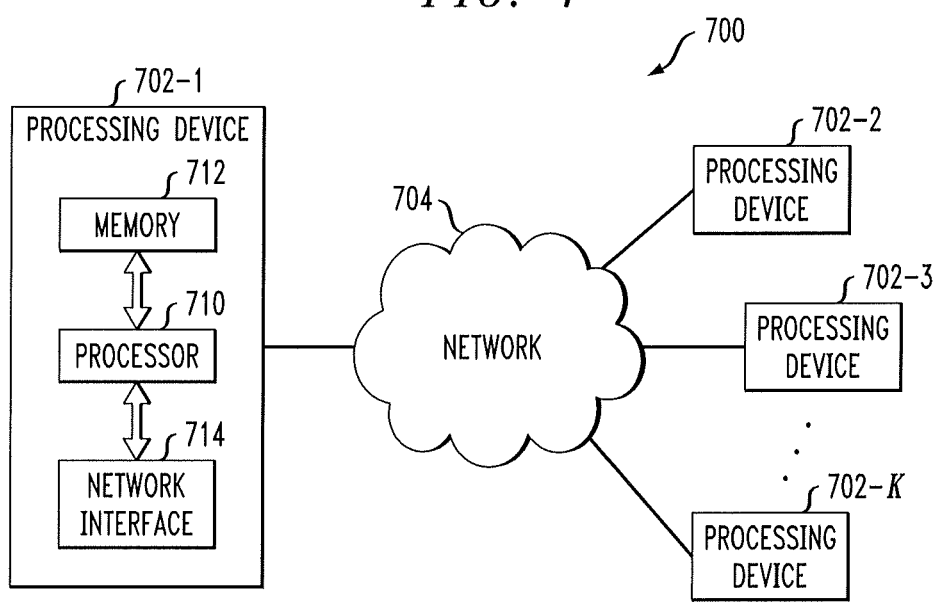

As shown in FIG. 6, portions of the information processing system 100 may comprise cloud infrastructure 600. The cloud infrastructure 600 comprises virtual machines (VMs) 602-1, 602-2, ... 602-L implemented using a hypervisor 604. The hypervisor 604 runs on physical infrastructure 605. The cloud infrastructure 600 further comprises sets of applications 610-1, 610-2, ... 610-L running on respective ones of the virtual machines 602-1, 602-2, ... 602-L under the control of the hypervisor 604.

Although only a single hypervisor 604 is shown in the embodiment of FIG. 6, the system 100 may of course include multiple hypervisors each providing a set of virtual machines using at least one underlying physical machine. Different sets of virtual machines provided by one or more hypervisors may be utilized in configuring multiple instances of the burst buffer appliance 102.

An example of a commercially available hypervisor platform that may be used to implement hypervisor 604 and possibly other portions of the information processing system 100 in one or more embodiments of the invention is the VMware® vSphere™ which may have an associated virtual infrastructure management system such as the VMware® vCenter™. The underlying physical machines may comprise one or more distributed processing platforms that include storage products, such as VNX and Symmetrix VMAX, both commercially available from EMC Corporation of Hopkinton, Mass. A variety of other storage products may be utilized to implement at least a portion of the system 100.

One or more of the processing modules or other components of system 100 may therefore each run on a computer, server, storage device or other processing platform element. A given such element may be viewed as an example of what is more generally referred to herein as a "processing device." The cloud infrastructure 600 shown in FIG. 6 may represent at least a portion of one processing platform. Another example of such a processing platform is processing platform 700 shown in FIG. 7.

The processing platform 700 in this embodiment comprises a portion of system 100 and includes a plurality of processing devices, denoted 702-1, 702-2, 702-3, ... 702-K, which communicate with one another over a network 704.

The network 704 may comprise any type of network, including by way of example a global computer network such as the Internet, a WAN, a LAN, a satellite network, a telephone or cable network, a cellular network, a wireless network such as WiFi or WiMAX, or various portions or combinations of these and other types of networks.

The processing device 702-1 in the processing platform 700 comprises a processor 710 coupled to a memory 712. The processor 710 may comprise a microprocessor, a microcontroller, an application-specific integrated circuit (ASIC), a field-programmable gate array (FPGA) or other type of processing circuitry, as well as portions or combinations of such circuitry elements, and the memory 712, which may be viewed as an example of a "computer program product" having executable computer program code embodied therein, may comprise random access memory (RAM), read-only memory (ROM) or other types of memory, in any combination.

Also included in the processing device 702-1 is network interface circuitry 714, which is used to interface the processing device with the network 704 and other system components, and may comprise conventional transceivers.

The other processing devices 702 of the processing platform 700 are assumed to be configured in a manner similar to that shown for processing device 702-1 in the figure.

Again, the particular processing platform 700 shown in the figure is presented by way of example only, and system 100 may include additional or alternative processing platforms, as well as numerous distinct processing platforms in any combination, with each such platform comprising one or more computers, servers, storage devices or other processing devices.

It should therefore be understood that in other embodiments different arrangements of additional or alternative elements may be used. At least a subset of these elements may be collectively implemented on a common processing platform, or each such element may be implemented on a separate processing platform.

Also, numerous other arrangements of computers, servers, storage devices or other components are possible in the information processing system 100. Such components can communicate with other elements of the information processing system 100 over any type of network or other communication media.

As indicated previously, components of a burst buffer appliance as disclosed herein can be implemented at least in part in the form of one or more software programs stored in memory and executed by a processor of a processing device such as one of the virtual machines 602 or one of the processing devices 702. A memory having such program code embodied therein is an example of what is more generally referred to herein as a "computer program product."

It should again be emphasized that the above-described embodiments of the invention are presented for purposes of illustration only. Many variations and other alternative embodiments may be used. For example, the disclosed techniques are applicable to a wide variety of other types of information processing systems, computer systems and file systems that can benefit from increased RDMA efficiency using one or more burst buffer appliances as described herein. Also, the particular configurations of system and device elements shown in FIGS. 1 through 7 can be varied in other embodiments. Thus, for example, the number of burst buffer appliances deployed in a given embodiment and their respective configurations may be varied. Moreover, the various assumptions made above in the course of describing the illustrative embodiments should also be viewed as exemplary rather than as requirements or limitations of the invention. Numerous other alternative embodiments within the scope of the appended claims will be readily apparent to those skilled in the art.

What is claimed is:

1. An apparatus comprising:
   a burst buffer appliance adapted for coupling between a computer system and a file system;
   the burst buffer appliance comprising:
   a first memory;
   at least one additional memory; and
   a controller;
   the first memory and the at least one additional memory comprising respective portions of a high-speed memory of the burst buffer appliance with the high-speed memory having a substantially lower access time than the file system;
   the controller comprising a remote direct memory access module of the burst buffer appliance;
   the controller being configured to detect a remote direct memory access operation between a given compute node of the computer system and the additional memory, and to execute the detected remote direct memory access operation in a manner that bypasses utilization of an operating system associated with the first memory;
   wherein the operating system associated with the first memory comprises a primary operating system of the burst buffer appliance;
   wherein bypassing utilization of the operating system associated with the first memory comprises moving data from a host channel adaptor of the remote direct memory access module to the additional memory without utilizing computational resources of a central processing unit on which the primary operating system executes;
   wherein the controller comprises a virtual machine arranged between the host channel adaptor and the additional memory;
   wherein the virtual machine is configured to identify a remote direct memory access operation directed to an address space of the additional memory and to control flow of data associated with that operation between the host channel adaptor and the additional memory; and
   wherein the virtual machine comprises a buffer configured to store data passing between the host channel adaptor and the additional memory, and a flow control mechanism associated with the buffer.

2. The apparatus of claim 1 wherein the first memory comprises a main memory of the burst buffer appliance.

3. The apparatus of claim 1 wherein the additional memory comprises a flash device of the burst buffer appliance.

4. The apparatus of claim 3 wherein the flash device comprises at least one flash PCIe card installed in the burst buffer appliance.

5. The apparatus of claim 3 wherein the flash device is configured to operate as a direct memory access target.

6. The apparatus of claim 3 wherein the controller comprises hardware acceleration circuitry implemented in the flash device.

7. The apparatus of claim 6 wherein the hardware acceleration circuitry implemented in the flash device comprises a buffer and associated direct memory access target circuitry.

8. The apparatus of claim 1 wherein the host channel adaptor comprises at least one of an InfiniBand host channel adaptor and a gigabit Ethernet host channel adaptor.

9. A processing platform comprising the apparatus of claim 1.

10. The apparatus of claim 1 wherein the high-speed memory of the burst buffer appliance stores data from the computer system that is to be delivered to the file system and data from the file system that is to be delivered to the computer system.

11. The apparatus of claim 1 wherein the high-speed memory of the burst buffer appliance serves as a buffer between the computer system and the file system for storing bursts of data associated with different types of input-output operations involving the computer system and the file system.

12. A method comprising:
configuring a burst buffer appliance adapted for coupling between a computer system and a file system to include a first memory and at least one additional memory;
detecting a remote direct memory access operation between a given compute node of a computer system and the additional memory; and
executing the detected remote direct memory access operation in a manner that bypasses utilization of an operating system associated with the first memory;
the first memory and the at least one additional memory comprising respective portions of a high-speed memory of the burst buffer appliance with the high-speed memory having a substantially lower access time than the file system;
wherein the operating system associated with the first memory comprises a primary operating system of the burst buffer appliance; and
wherein bypassing utilization of said operating system associated with the first memory comprises moving data from a host channel adaptor of the burst buffer appliance to the additional memory without utilizing computational resources of a central processing unit on which the primary operating system executes;
the method further comprising:
providing a virtual machine arranged between the host channel adaptor and the additional memory;
wherein the detecting and executing are implemented at least in part utilizing the virtual machine;
wherein the detecting comprises identifying in the virtual machine a remote direct memory access operation directed to an address space of the additional memory, and further wherein the executing comprises utilizing the virtual machine to control flow of data associated with that operation between the host channel adaptor and the additional memory; and
wherein the virtual machine comprises a buffer configured to store data passing between the host channel adaptor and the additional memory, and a flow control mechanism associated with the buffer.

13. A computer program product comprising a processor-readable storage medium having encoded therein executable code of one or more software programs, wherein the one or more software programs when executed in at least one processing device cause the processing device to perform the method of claim 12.

14. The method of claim 12 wherein the first memory comprises a main memory of the burst buffer appliance.

15. The method of claim 12 wherein the additional memory comprises a flash device of the burst buffer appliance.

16. The method of claim 15 wherein the flash device comprises at least one flash PCIe card installed in the burst buffer appliance.

17. The method of claim 15 wherein the flash device is configured to operate as a direct memory access target.

18. An information processing system comprising:
a computer system;
a file system; and
a burst buffer appliance coupled between the computer system and the file system, the burst buffer appliance comprising:
a first memory;
at least one additional memory; and
a controller;
the first memory and the at least one additional memory comprising respective portions of a high-speed memory of the burst buffer appliance with the high-speed memory having a substantially lower access time than the file system;
the controller comprising a remote direct memory access module of the burst buffer appliance;
the controller being configured to detect a remote direct memory access operation between a given compute node of the computer system and the additional memory, and to execute the detected remote direct memory access operation in a manner that bypasses utilization of an operating system associated with the first memory;
wherein the operating system associated with the first memory comprises a primary operating system of the burst buffer appliance;
wherein bypassing utilization of the operating system associated with the first memory comprises moving data from a host channel adaptor of the remote direct memory access module to the additional memory without utilizing computational resources of a central processing unit on which the primary operating system executes;
wherein the controller comprises a virtual machine arranged between the host channel adaptor and the additional memory;
wherein the virtual machine is configured to identify a remote direct memory access operation directed to an address space of the additional memory and to control flow of data associated with that operation between the host channel adaptor and the additional memory; and
wherein the virtual machine comprises a buffer configured to store data passing between the host channel adaptor and the additional memory, and a flow control mechanism associated with the buffer.

19. The system of claim 18 wherein the first memory comprises a main memory of the burst buffer appliance.

20. The system of claim 18 wherein the additional memory comprises a flash device of the burst buffer appliance.

* * * * *